United States Patent
Cheng et al.

(10) Patent No.: US 7,440,234 B1
(45) Date of Patent: Oct. 21, 2008

(54) DISK DRIVE INCLUDING AN ACTUATOR ARM WITH A REGION OF REDUCED THICKNESS BETWEEN AN ARM LONGITUDINAL AXIS AND A DISK AXIS OF ROTATION

(75) Inventors: Chunjer Chuck Cheng, Saratoga, CA (US); David J. Bagaoisan, Santa Clara, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 403 days.

(21) Appl. No.: 11/385,091

(22) Filed: Mar. 21, 2006

(51) Int. Cl.
*G11B 5/55* (2006.01)
*G11B 21/21* (2006.01)

(52) U.S. Cl. .................. 360/266; 360/265.9; 360/244.8
(58) Field of Classification Search ............. 360/244.8, 360/265.9; 369/266
See application file for complete search history.

(56) References Cited

U.S. PATENT DOCUMENTS

| | | | |
|---|---|---|---|
| 5,999,369 A * | 12/1999 | Shimizu et al. ......... | 360/244.5 |
| 6,088,192 A | 7/2000 | Riener et al. | |
| 6,462,910 B1 * | 10/2002 | Shimizu et al. ......... | 360/244.8 |
| 6,958,879 B2 * | 10/2005 | Oh et al. ................ | 360/75 |
| 2002/0085314 A1 | 7/2002 | Williams | |
| 2002/0186512 A1 * | 12/2002 | Kubotera et al. ........ | 360/266 |
| 2005/0007701 A1 | 1/2005 | Oh et al. | |
| 2005/0207055 A1 * | 9/2005 | Oh et al. ................ | 360/75 |
| 2006/0114614 A1 * | 6/2006 | Tsujino et al. ......... | 360/266 |

* cited by examiner

*Primary Examiner*—Jefferson Evans
(74) *Attorney, Agent, or Firm*—Stetina, Brunda, Garred & Brucker

(57) ABSTRACT

There is provided a disk drive including a disk and an actuator. The actuator includes a first actuator arm. The first actuator arm has a region of reduced thickness between an arm longitudinal axis and a disk axis of rotation. An average thickness of the first actuator arm in the region of reduced thickness is less than an average thickness of the first actuator arm at an equal distance from an actuator axis of rotation but on an opposing side of the arm longitudinal axis. The actuator includes a suspension assembly having first and second flexible legs. The suspension assembly is coupled to the first actuator arm via the flexible legs. The second flexible leg is disposed further from the disk in a direction parallel to the disk axis of rotation than the first flexible leg and closer to the disk axis of rotation than the first flexible leg.

12 Claims, 4 Drawing Sheets

DISK DRIVE INCLUDING AN ACTUATOR ARM WITH A REGION OF REDUCED THICKNESS BETWEEN AN ARM LONGITUDINAL AXIS AND A DISK AXIS OF ROTATION

FIELD OF THE INVENTION

The present invention relates generally to disk drives, and in particular to a disk drive actuator including an actuator arm with a region of reduced thickness between an arm longitudinal axis and a disk axis of rotation.

BACKGROUND

The typical hard disk drive includes a head disk assembly (HDA) and a printed circuit board assembly (PCBA) attached to a disk drive base of the HDA. The head disk assembly includes at least one disk (such as a magnetic disk), a spindle motor for rotating the disk, and a head stack assembly (HSA). The printed circuit board assembly includes a servo control system in the form of a disk controller for generating servo control signals. The head stack assembly includes at least one head, typically several, for reading and writing data from and to the disk. The head stack assembly is controllably positioned in response to the generated servo control signals from the disk controller. In so doing, the attached heads are moved relative to tracks disposed upon the disk.

The head stack assembly includes an actuator assembly, and at least one head gimbal assembly with a flexure. A conventional "rotary" or "swing-type" actuator assembly typically includes a rotary actuator having an actuator body. The actuator body has a pivot bearing cartridge to facilitate rotational movement of the actuator assembly. An actuator coil is supported by the actuator body and is configured to interact with one or more magnets, typically a pair, to form a voice coil motor. One or more actuator arms extend from an opposite side of the actuator body. This configuration of an actuator body and actuator arms is sometimes referred to as an "E-block."

Each head gimbal assembly is attached to a distal end of one of the actuator arms. A head gimbal assembly includes a suspension assembly that supports a head. The suspension assembly includes a swage plate that is swage attached to the distal end of the actuator arm. The suspension assembly further includes a load beam and a hinge plate that is disposed between the swage plate and the load beam. Where the hinge plate is integrated with the load beam, the hinge plate may be referred to as a bend area of the load beam. The load beam is attached to the hinge plate with the load beam extending distally from the hinge plate and the actuator arm. The hinge plate allows the load beam to move the attached head relative to the actuator arm. The hinge plate may be formed to provide a pre-load of the load beam towards the disk. This pre-load allows the load beam to maintain the head at a desired fly height over the disk surface even while the disk and/or the actuator arm is vibrating.

The spindle motor typically includes a rotatable spindle motor hub, a magnet attached to the spindle motor hub, and a stator. The stator typically includes a series of coils that are in electrical communication with the printed circuit board assembly. With this general configuration, the various coils of the stator are selectively energized to form an electromagnetic field that pulls/pushes on the magnet, thereby imparting a rotational motion onto the spindle motor hub. Rotation of the spindle motor hub results in the rotation of the attached disks about a disk axis of rotation.

Disk flutter refers to one or more disk modes of vibration, wherein as the disk vibrates, the disk surfaces move up and down (i.e., along the disk axis of rotation). As the disk moves up, the top surface is in compression and the bottom surface is in tension. As the disk moves down, the top surface is in tension and the bottom surface is in compression. At least this tension and compression modality results in the tracks on the disk surfaces to have a motion that includes not only a component that is parallel to the disk axis of rotation, but also a component that is radial. Therefore, as the disk vibrates out of plane, the head assigned to follow a track upon the disk surface tends to become off-track. Specifically, as the disk moves up towards a head assigned to follow a track, such head tends to become off-track to the OD of the disk. As the disk moves away from a head assigned to follow a track, such head tends to become off-track to the ID of the disk.

During operation of the disk drive, the heads must be controllably positioned in relation to tracks of the disks. An approach to compensate for the disk flutter induced off-track motion is to vertically offset one side of the hinge plate of the suspension assembly relative to the associated actuator arm. The hinge plate may be attached to the actuator arm such that a side of the load beam that is closer to the disk axis of rotation is spaced closer to the disk surface than the other side of the hinge plate. This may be accomplished via a small spacer used to off-set one side of the hinge plate. With a side of the hinge plate off-set in this manner, flexing of the hinge plate to allow the head to move up and down also causes a compensatory radial motion of the head with respect to the disk. While such an offset hinge plate approach is effective in compensating for disk flutter induced off-track motion, this approach also introduces an additional and unintended source of (and sensitivity to) off-track motion when the actuator arm vibrates. Therefore, there is a need in the art to find a way to at least partially avoid or reduce an increase in off-track motion due to actuator arm vibration, while employing an offset hinge in the suspension assembly to reduce off-track motion due to disk vibration.

SUMMARY

According to an aspect of the present invention, there is provided a disk drive including a disk drive base, a disk rotatably coupled to the disk drive base about a disk axis of rotation, and an actuator rotatably coupled to the disk drive base about an actuator axis of rotation. The actuator includes a first actuator arm defining an arm longitudinal axis extending from the actuator axis of rotation. The first actuator arm has a region of reduced thickness disposed between the arm longitudinal axis and the disk axis of rotation. An average thickness of the first actuator arm in the region of reduced thickness is less than an average thickness of the first actuator arm at an equal distance from the actuator axis of rotation but on an opposing side of the arm longitudinal axis. The actuator further includes a first suspension assembly having first and second flexible legs. The first suspension assembly is coupled to the first actuator arm via the first and second flexible legs. The second flexible leg is disposed closer to the disk in a direction parallel to the disk axis of rotation than the first flexible leg and closer to the disk axis of rotation than the first flexible leg.

According to various embodiments, the first actuator arm may include a first recess, and the region of reduced thickness may be disposed at the first recess. The first recess may be disposed in the first actuator arm opposite the disk in a direction parallel to the disk axis of rotation. The first recess may be generally step-shaped. The region of reduced thickness may be generally elongate extending along the first actuator arm. The first actuator arm may include a first rail, a second rail, and an arm opening disposed through the first actuator arm between the first and second rails. The region of reduced thickness may be disposed at the first rail.

Further, the region of reduced thickness may extend in a direction orthogonal to the arm longitudinal axis between 50% and 100% across the first rail. The region of reduced thickness may have a width in a direction orthogonal to the arm longitudinal axis that is between 10% and 25% of an overall width of the first actuator arm at a same distance along the arm longitudinal axis from the actuator axis of rotation. The average thickness in the region of reduced thickness may be between 5% and 30% of the average thickness of the first actuator arm at an equal distance from the actuator axis of rotation but at an opposing side of the arm longitudinal axis. The disk drive may further include electrically conductive traces disposed along the first actuator arm and on an opposite side of the arm longitudinal axis than is the region of reduced thickness.

In addition, the actuator may further include a second actuator arm. The disk may be disposed between the first and second actuator arms with respect to disk axis of rotation. The second arm may define a second arm longitudinal axis extending from the actuator axis of rotation. The second actuator arm may have a region of reduced thickness being disposed between the second arm longitudinal axis and the disk axis of rotation. The second actuator arm may have a region of reduced thickness disposed between the second arm longitudinal axis and the disk axis of rotation. An average thickness of the second actuator arm in the region of reduced thickness may be less than an average thickness of the second actuator arm at an equal distance from the actuator axis of rotation but on an opposing side of the second arm longitudinal axis. The disk drive may further include a second suspension assembly having first and second flexible legs. The second suspension assembly may be coupled to the second actuator arm via the first and second flexible legs of the second suspension assembly. The second flexible leg of the second suspension assembly may be disposed closer to the disk in a direction parallel to the disk axis of rotation than the first flexible leg of the second suspension assembly and closer to the disk axis of rotation than the first flexible leg of the second suspension assembly.

DESCRIPTION OF THE PREFERRED EMBODIMENTS

Figure 1:
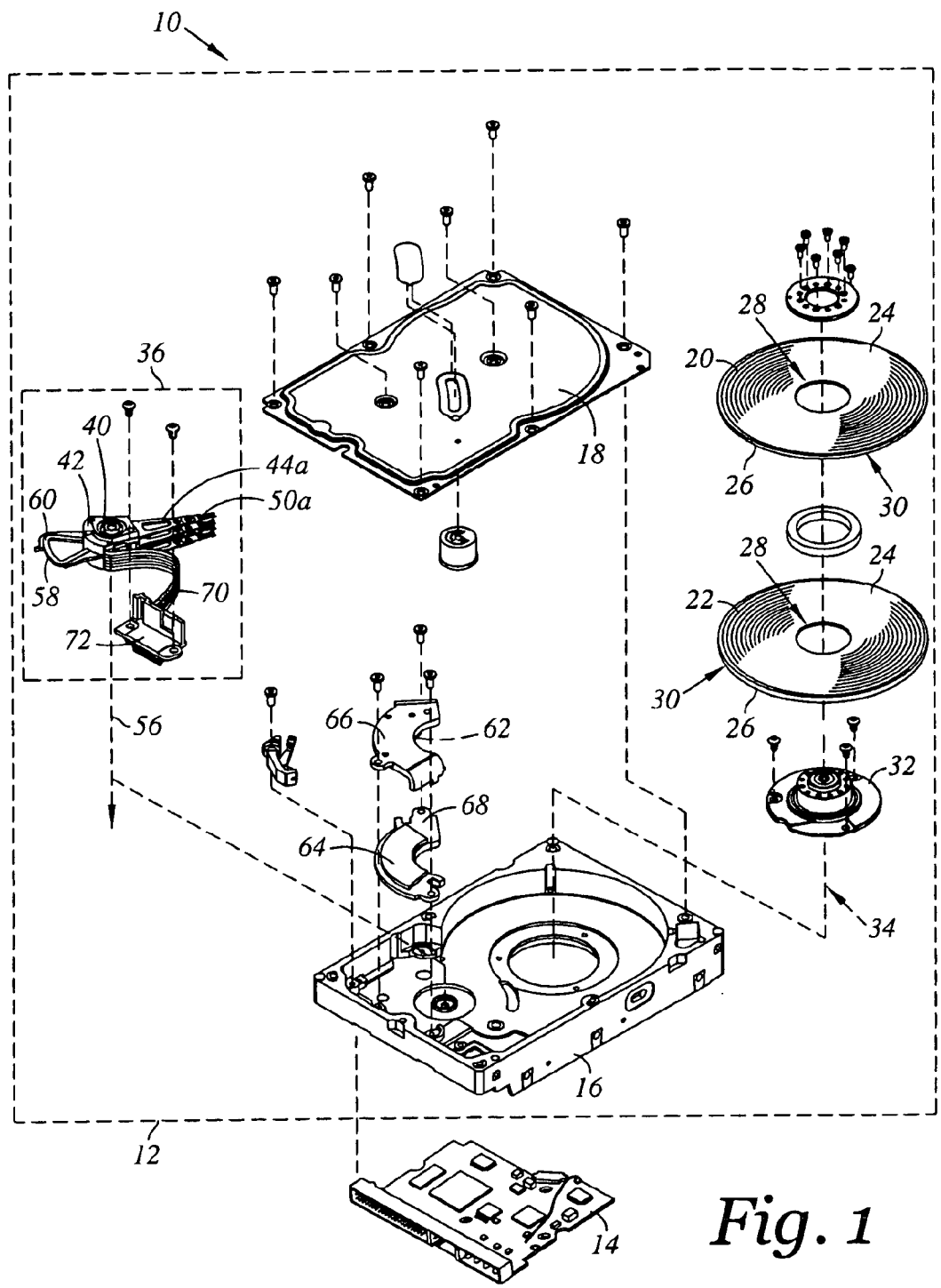
FIG. 1 is an exploded top perspective view of a disk drive compatible with an actuator assembly of an exemplary embodiment of the present invention.

Referring now to FIG. 1, there is depicted an exploded perspective view of a disk drive 10 capable of incorporating an embodiment of the present invention (details of which are discussed below and shown in additional figures). The disk drive 10 includes a head disk assembly (HDA) 12 and a printed circuit board assembly (PCBA) 14. The head disk assembly 12 includes a disk drive housing having disk drive housing members, such as a disk drive base 16 and a cover 18. The disk drive base 16 and the cover 18 collectively house disks 20, 22. A single disk or additional disks may be utilized. Each of the disks 20, 22 includes opposing disk upper and lower surfaces 24, 26, an inner diameter (ID) 28, an outer diameter (OD) 30, and a plurality of tracks for storing data disposed between the inner and outer diameters 28, 30. The disks 20, 22 may be of a magnetic recording type of storage device, however, other arrangements such as optical recording may be utilized.

The head disk assembly 12 further includes a spindle motor 32 for rotating the disks 20, 22 about a disk rotation axis 34. The head disk assembly 12 further includes an actuator assembly 36. The actuator assembly 36 includes a head stack assembly 38 rotatably attached to the disk drive base 16 in operable communication with the disks 20, 22. The head stack assembly 38 includes a rotary actuator 40.

Figure 2:
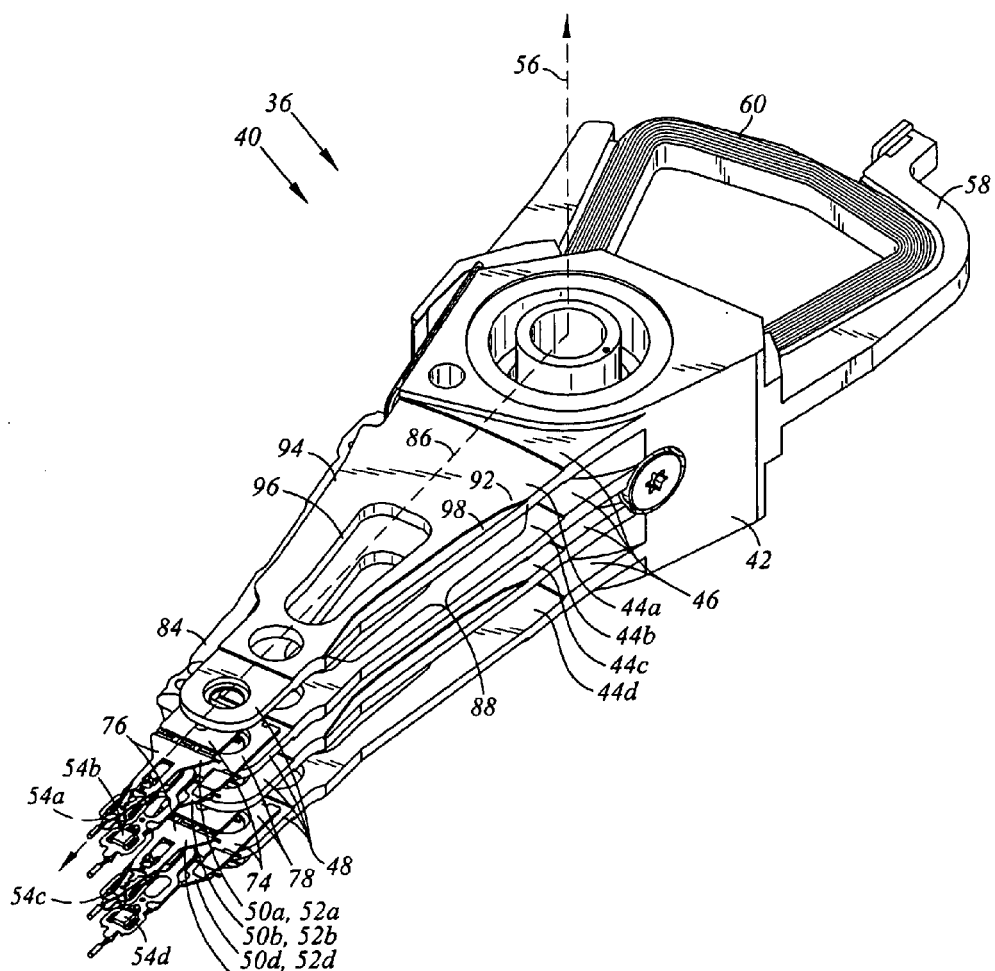
FIG. 2 is an enlarged perspective top view of the actuator assembly of FIG. 1.
Figure 5:
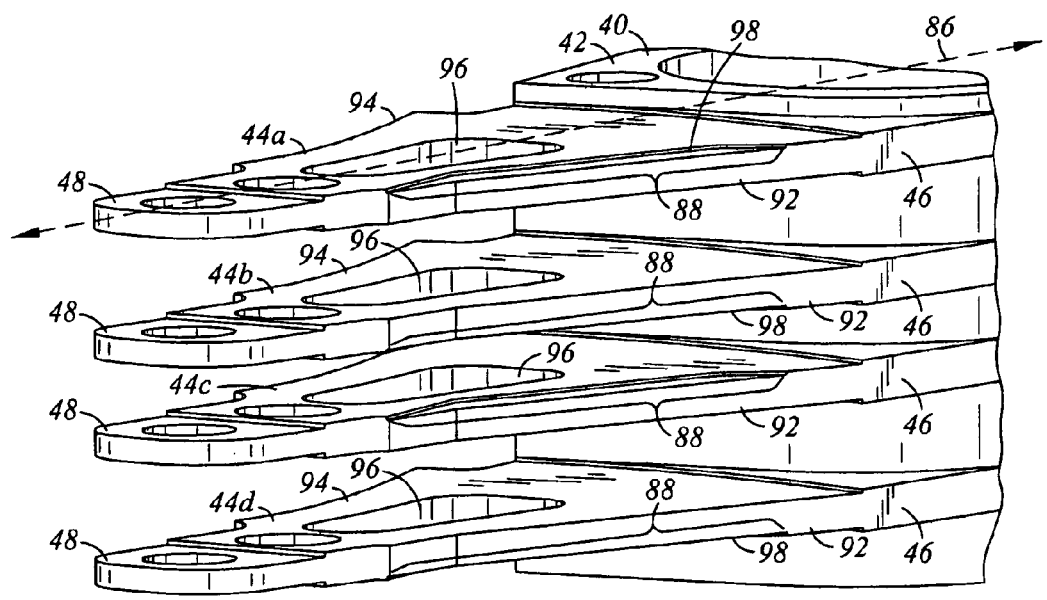
FIG. 5 is an enlarged perspective top view of a portion of an actuator of the actuator assembly of an embodiment of the present invention.

Referring additionally to FIG. 2, there is depicted an enlarged perspective top view of the actuator assembly 36. FIG. 5 is an enlarged perspective top view of a portion of an actuator 40 of the actuator assembly 36 without any electrical components attached thereto. The rotary actuator 40 includes an actuator body 42 and actuator arms 44 (individually denoted 44a-d) that extend from the actuator body 42. In FIG. 1, for ease of illustration, only the actuator arm 44a is denoted. Each of the actuator arms 44 has a proximal end 46 attached to the actuator body 42 and a distal end 48. In the embodiment shown, head gimbal assemblies 50a-d are distally respectively attached to the actuator arms 44a-d at the distal ends 48. Each of the head gimbal assemblies 50a-d includes suspension assemblies 52a-d that respectively support heads 54a-d (in FIG. 2, heads 54a and c are denoted with dashed lining as it is understood that each is respectively disposed at an underside of the suspension assemblies 52a and c). It is contemplated that the number of actuator arms and head gimbal assemblies may vary depending upon the number of disks and disk surfaces utilized.

Figure 3:
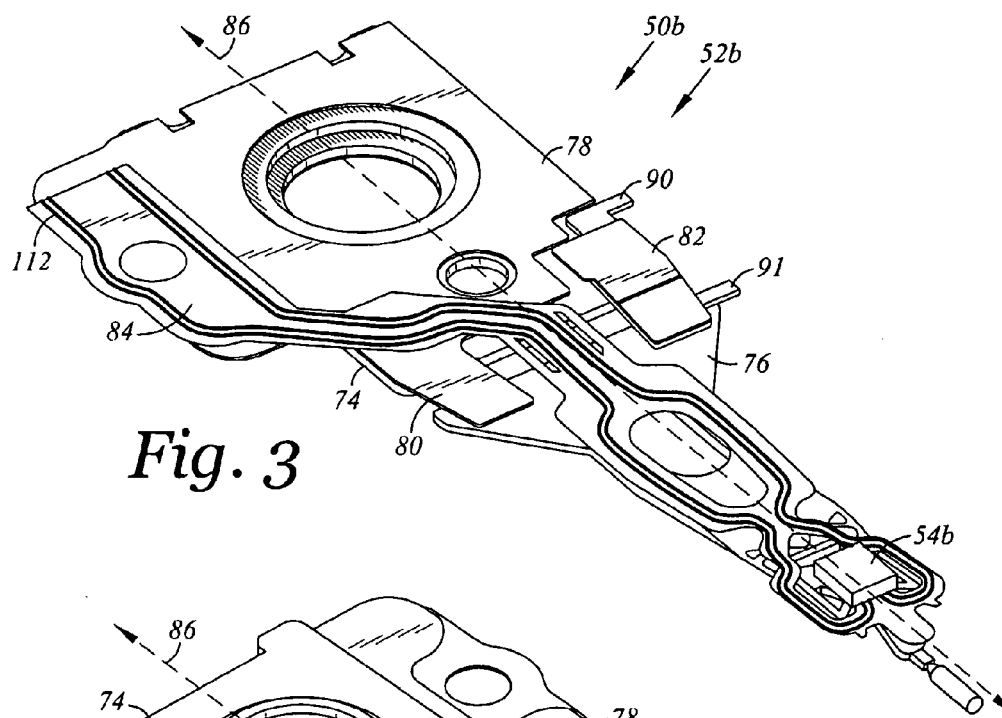
FIG. 3 is an enlarged perspective top view of a head gimbal assembly of the actuator assembly of the disk drive of FIG. 1, of an embodiment of the present invention.
Figure 4:
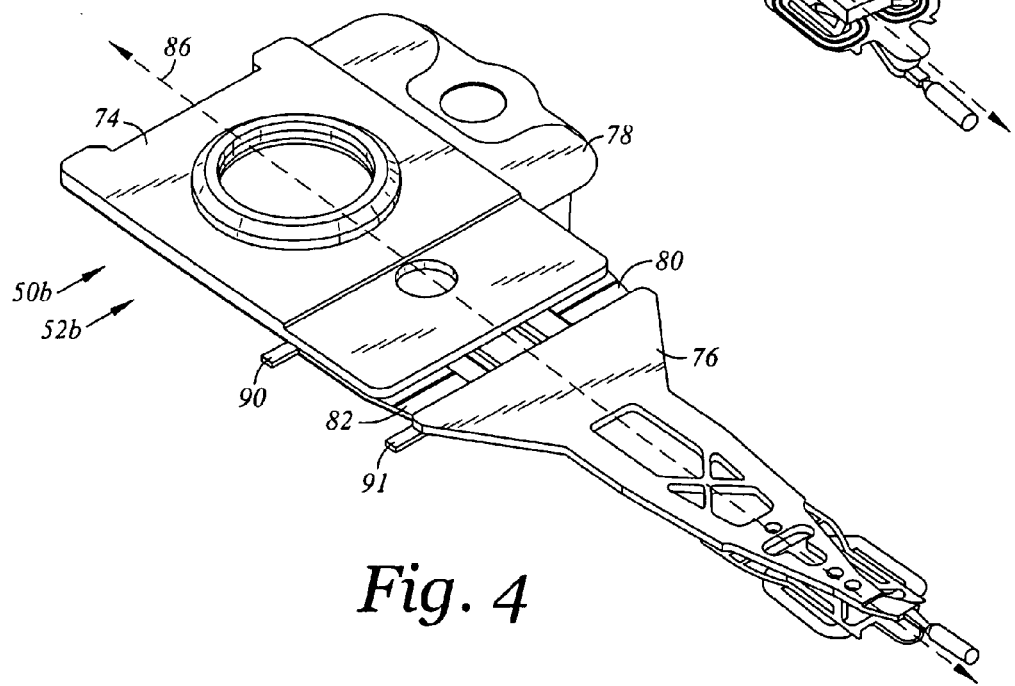
FIG. 4 is an enlarged perspective bottom view of the head gimbal assembly of FIG. 3.

Referring additionally to FIGS. 3 and 4, FIG. 3 is an enlarged perspective top view of head gimbal assembly 50b, and FIG. 4 is an enlarged perspective bottom view of the head gimbal assembly 50b. The head 54b is configured to interact with the lower surface 26 of the disk 20. Each of the heads 54a-d typically includes a transducer for writing and reading data. At the least, each transducer includes a read element and may additionally include a writer. In this regard, each of the heads 54a-d may be referred to as a read head. In magnetic recording applications, the transducer's writer may be of a longitudinal or perpendicular design, and the read element of the transducer may be inductive or magnetoresistive. In optical and magneto-optical recording applications, the head 54 may also include an objective lens and an active or passive mechanism for controlling the separation of the objective lens from a disk surface of the disks 20, 22. Each of the disks 20, 22 includes opposing disk surfaces. In magnetic recording applications the disk surface typically includes one or more magnetic layers. Data may be recorded along data annular regions on a single disk surface or both.

The actuator assembly 36 may be pivoted such that each of the heads 54a-d is disposed adjacent to the various data annular regions from adjacent the outer diameter 30 to adjacent the inner diameter 28 of each of the disks 20, 22. In the embodiment shown, the actuator body 42 includes a bore, and the rotary actuator 40 further includes a pivot bearing cartridge engaged within the bore for facilitating the actuator body 42 to rotate between limited positions about an axis of rotation 56. The rotary actuator 40 further includes a coil support 58 that extends from one side of the actuator body 42 opposite the actuator arms 44. The coil support 58 is configured to support an actuator coil 60.

First and second magnets 62, 64 are supported by magnet supports 66, 68 which are attached to the disk drive base 16 (the first magnet 62 is denoted in dashed lining and it is understood that it is disposed at an underside of the magnet support 66). The actuator coil 60 interacts with the first and second magnets 62, 64 to form a voice coil motor for controllably rotating the actuator 40. The actuator assembly 36 further includes a flex cable assembly 70 and a cable connector 72. The cable connector 70 is attached to the disk drive base 16 and is disposed in electrical communication with the printed circuit board 14. The flex cable assembly 70 supplies current to the actuator coil 60 and carries signals between the heads 54a-d and the printed circuit board assembly 14.

In the embodiment shown, each of the suspension assemblies 52a-d includes a swage plate 74 that is swage attached to the distal end 48 of a respective one of the actuator arms 44a-d. Each of the suspension assemblies 52a-d further includes a load beam 76 and a hinge plate 78 that is disposed between the swage plate 74 and the load beam 76. Where the hinge plate 78 is integrated with the load beam 76, the hinge plate 78 may be referred to as a bend area of the load beam 76. Each load beam 76 is respectively attached to a given one of the hinge plates 78 with each of the load beams 76 extending distally from the hinge plates 78 and the actuator arms 44a-d. Each of the hinge plates 78 includes first and second flexible legs 80, 82. Each load beam 76 is coupled to the actuator arms 44a-d via attachment to the first and second flexible legs 80, 82 of a given one of the hinge plates 78. The hinge plates 78 may include a pre-load so as to bias the attached load beams 76 towards their respective disks 20, 22.

A trace assembly 84 is electrically connected to the flex cable assembly 70. The trace assembly 84 may be referred to as a flexure. The trace assembly 84 extends along each of the actuator arms 44. As seen in FIG. 2, the trace assembly 84 extends along the actuator arm 44a. The heads 54a-d are attached to and electrically connected to the trace assembly 84. The trace assembly 84 may include a flex tail at an opposite end of the trace assembly 84 that is electrically connect to the flex cable assembly 70 adjacent the actuator body 42.

According to an embodiment as shown, there is provided the disk drive 10 including the disk drive base 16, a disk (such as disk 20) rotatably coupled to the disk drive base 16 about the disk axis of rotation 34, and the actuator 40 rotatably coupled to the disk drive base 16 about the actuator axis of rotation 56. The actuator 40 includes a first actuator arm (such as the actuator arm 44b) defining an arm longitudinal axis 86 extending from the actuator axis of rotation 56 (in FIGS. 2 and 5, for ease of illustration the arm longitudinal axis 86 is only shown in connection with the actuator arm 44a). The actuator arm 44b has a region of reduced thickness 88 disposed between the arm longitudinal axis 86 and the disk axis of rotation 34. An average thickness of the actuator arm 44b in the region of reduced thickness 88 is less than an average thickness of the actuator arm 44b at an equal distance from the actuator axis of rotation 56 but on an opposing side of the arm longitudinal axis 86. The actuator 40 further includes a first suspension assembly (such as suspension assembly 52b) having first and second flexible legs 80, 82. The suspension assembly 52a is coupled to the actuator arm 44a via the first and second flexible legs 80, 82. The second flexible leg 82 is disposed closer to the disk 20 in a direction parallel to the disk axis of rotation 34 than the first flexible leg 80 and closer to the disk axis of rotation 34 than the first flexible leg 80.

According to various embodiments, the actuator arms 44a-d each may include a recess 98, and the region of reduced thickness 88 may be disposed at the recess 98. The recess 98 may be disposed in the actuator arms 44a-d opposite the disk (20 or 22) in a direction parallel to the disk axis of rotation 34. The recess 98 may be generally step-shaped such as shown. The region of reduced thickness 88 may be generally elongate respectively extending along the each of the actuator arms 44a-d. Each of the actuator arms 44a-d may include a first rail 92, a second rail 94, and an arm opening 96 disposed through each of the actuator arms 44a-d between the first and second rails 92, 94. The region of reduced thickness 88 may be disposed at the first rail 92.

Further, the region of reduced thickness 88 may extend in a direction orthogonal to the arm longitudinal axis 86 between 50% and 100% across the first rail 92. In the embodiment of FIGS. 1-5, the region of reduced thickness 88 extends approximately 50% across the first rail 92. The region of reduced thickness 88 may have a width in a direction orthogonal to the arm longitudinal axis 86 that is between 10% and 25% of an overall width of each of the actuator arms 44a-d at a same distance along the arm longitudinal axis 86 from the actuator axis of rotation 56. In the embodiment of FIGS. 1-5 for example, the region of reduced thickness 88 has a width in a direction orthogonal to the arm longitudinal axis 86 that is approximately 15% of an overall width of each of the actuator arms 44a-d at a same distance along the arm longitudinal axis 86 from the actuator axis of rotation 56.

The average thickness in the region of reduced thickness 88 may be between 5% and 30% of the average thickness of a given one of the respective actuator arms 44a-d at an equal distance from the actuator axis of rotation 56 but at an opposing side of the arm longitudinal axis 86. In the embodiment of FIGS. 1-5 for example, the average thickness in the region of reduced thickness 88 is approximately 85% of the average thickness of a given one of the respective actuator arms 44a-d at an equal distance from the actuator axis of rotation 56, but at an opposing side of the arm longitudinal axis 86. As an example, the average thickness of the actuator arms 44a-d may be 1 mm and the average thickness in the region of reduced thickness 88 may be 0.85 mm.

It is contemplated that the sizing, geometry, and location of the region of reduced thickness 88 may vary. For example, rather than the sharp angled stepped configuration of the recess 98 as shown, a more rounded, tapered, or beveled cornering may be utilized. While the thickness of the actuator arm s44a-d are shown as being uniform in the region of reduced thickness 88, it is contemplated that the region of reduced thickness 88 may have a non-uniform thickness. Further, while the recess 98 is shown as a single recess, the recess 98 may take the form of multiple openings or cavities formed in the actuator arms 44a-d.

As mentioned above, the actuator arms 44a-d each has a region of reduced thickness 88 disposed between the arm longitudinal axis 86 and the disk axis of rotation 34. An average thickness of each of the actuator arms 44a-d in the region of reduced thickness 88 is less than an average thickness of the respective ones of the actuator arms 44a-d at an equal distance from the actuator axis of rotation 56 but on an opposing side of the arm longitudinal axis 86. In this regard, it is contemplated that when the actuator arms 44a-d are subject to bending about an axis that is orthogonal to and through the disk axis of rotation 34, the side of the actuator arms 44a-d that is closer to the disk axis of rotation 34 is not as stiff as the side of the actuator arms 44a-d that is further away from the disk axis of rotation 34.

As a result of the differing stiffness laterally across the actuator arms 44a-d, during bending of the actuator arms 44a-d about an axis that is orthogonal to and through the actuator axis of rotation 56, the actuator arms 44a-d will tend to rotate about their respective arm longitudinal axis 86. Referring to the views of FIGS. 2 and 5 for example, as the actuator arm 44b is bent downward, the actuator arm 44b (and in particular the distal end 48 thereof) will tend to rotate in a clockwise direction about the arm longitudinal axis 86. As the actuator arm 44b is bent upward, the actuator arm 44b (and in particular the distal end 48 thereof) will tend to rotate in a counter-clockwise direction about the arm longitudinal axis 48.

As mentioned above, the second flexible leg 82 is disposed closer to the disk 20 in a direction parallel to the disk axis of rotation 34. As seen in FIGS. 3 and 4, a spacer 90 may be disposed between each swage plate 74 and each hinge plate 78. The interposition of the spacer 90 results in the second flexible leg 82 to be lifted out of plane in relative to the first flexible leg 80 and the remainder of the hinge plate 78. The load beam 76 is coupled to the hinge plate 78 through attachment to the first and second flexible legs 80, 82. In the embodiment shown, the spacer 90 includes a distal portion 91. The distal portion 91 is disposed between the load beam 76 and the second flexible leg 82. Though not required, the utilization of the distal portion 91 allows the second flexible leg 82 to lie flat with the distal portion 91 stacked between the load beam and the second flexible leg 82 without any gap. This facilitates an ease of manufacture allowing the second flexible leg 82 to be laser spot welded for attachment with the load beam 76 without the need to hold down the second flexible leg 82 to the load beam 76.

With the second flexible leg 82 offset in the manner shown, as the first and second flexible legs 80, 82 are flexed to allow the head 54b to move up and down, the load beam 76 also moves the head 54b in a radial direction with respect to the disk 20. In the view of FIG. 3, as the first and second flexible legs 80, 82 are flexed to allow the load beam 76 to move upward, the head 54b moves up and to the left (radially outward away from the disk axis of rotation 34). As the first and second flexible legs 80, 82 are flexed to allow the load beam 76 to move downward, the head 54b moves down and to the right (radially inward towards the disk axis of rotation 34).

It is contemplated that as the disk 20 is flexed upward during vibration, the lower surface 26 is in tension and the tracks on such lower surface 26 become shifted upward and radially outward away from the disk axis of rotation 23. For example, as the disk 20 is flexed downward during vibration, the lower surface 26 is in compression and the tracks on such lower surface 26 become shifted downward and radially inward towards the disk axis of rotation 23. As such, the amount of offset of the hinge plate 78 (as introduced by the second flexible leg 82 being closer to the lower surface 26 than the first flexible leg 80) may be used to compensate for the radial displacement of the tracks on the lower surface 26 due to the disk 20 flexing during disk vibration.

During operation of the disk drive 10, the actuator arms 44a-d are subject to modes of vibration. It is contemplated that the actuator arm and the disk resonant frequencies are discrete. As such, disk vibrational movement in relation to the load beams 76 may be analyzed assuming that the actuator arms 44a-d are static, and the actuator arm vibrational movement in relation to the load beams 76 may be analyzed assuming that the disks 20, 22 are static. With regard to the actuator arm 44b for example, when the actuator arm 44b is flexed downward (such as during a vibration mode) the distal end 48 moves away from the lower surface 26 of the disk 20. The hinge plate 78 and the swage plate 74 of the head gimbal assembly 50b are also moved downward. The head 54b is maintained adjacent the lower surface 26 due to the pre-load of the hinge plate 78. In response, the first and second flexible legs 80, 82 are flexed and the load beam 76 is moved upward and to the left (radially outward away from the disk axis of rotation 34) relative to the distal end 48 of the actuator arm 44b. However, during such downward bending of the actuator arm 44b, the distal end 48 of the actuator arm 44b tends to rotate in a clockwise direction about the arm longitudinal axis of rotation 86 because of the inclusion of the region of reduced thickness 88 along the actuator arm 44b. This rotation adjusts the particular track that the head 54b interacts with of the lower surface 26 of the disk 20 in a radial direction towards the disk axis of rotation 34. As such, the region of reduced thickness 88 may be utilized to compensate for radial movement of the heads 54a-d due to the second flexible leg 82 being offset.

The disk drive 10 may further include electrically conductive traces 112 disposed along the each of the actuator arms 44a-d and on an opposite side of the arm longitudinal axis than 86 is the region of reduced thickness 88. In FIG. 3 a representative one of the electrically conductive traces 112 is shown as disposed upon the trace assembly 84. In this regard, the conductive traces 112 may extend along a flexure tail of the trace assembly 84 and/or along a portion of the flex cable assembly 70.

Figure 6:
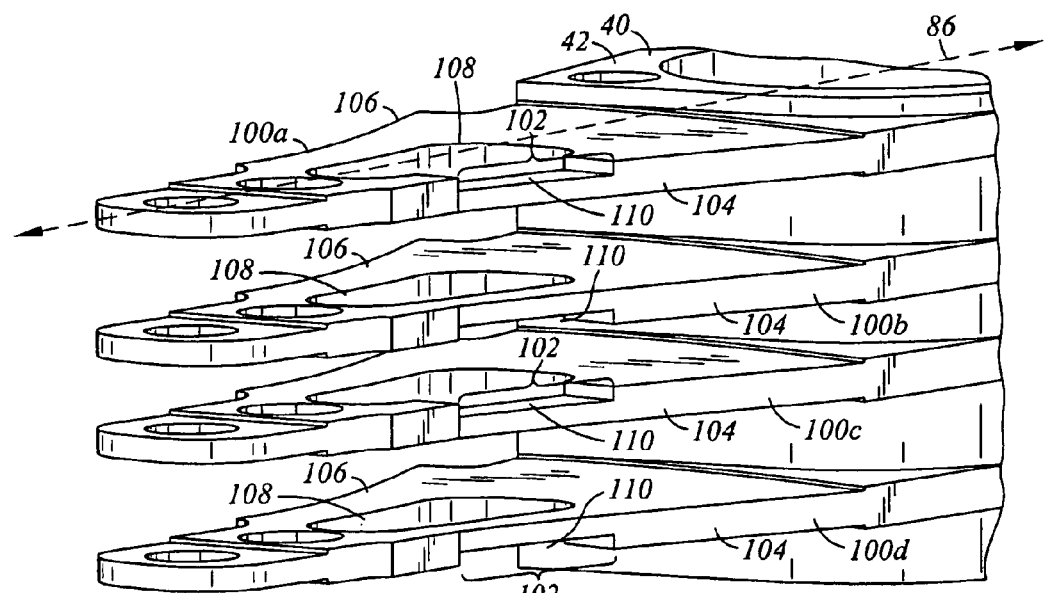
FIG. 6 is an exploded perspective top view of a portion of an actuator assembly of another embodiment of the present invention.

Referring now to FIG. 6, there is depicted another embodiment. Similar reference numerals as those in relation to the embodiments shown in FIGS. 1-5 are used to indicate similarly configured components, however, with those differences as noted below. FIG. 6 depicts a perspective view similar to a portion of the actuator assembly 36 of FIG. 5. However, in this embodiment, there is depicted an actuator assembly 36 with actuator arms 100a-d. Each of the actuator arms 100a-d may include a first rail 104, a second rail 106, and an arm opening 108 disposed through each of the actuator arms 100a-d between the first and second rails 104,106. Each of the actuator arms 100a-d includes a region of reduced thickness 102 disposed at the first rail 104. A recess 110 is disposed at the region of reduced thickness 102.

In the embodiment of FIG. 6, the region of reduced thickness 102 extends 100% across the first rail 104. The region of reduced thickness 102 has a width in a direction orthogonal to the arm longitudinal axis 86 that is approximately 20% of an overall width of each of the actuator arms 100a-d at a same distance along the arm longitudinal axis 86 from the actuator axis of rotation 56. The average thickness in the region of reduced thickness 110 is approximately 60% of the average thickness of a given one of the respective actuator arms 100a-d at an equal distance from the actuator axis of rotation 56 but at an opposing side of the arm longitudinal axis 86.

We claim:
1. A disk drive comprising:
a disk drive base;
a disk rotatably coupled to the disk drive base about a disk axis of rotation; and
an actuator rotatably coupled to the disk drive base about an actuator axis of rotation, the actuator including:

a first actuator arm defining an arm longitudinal axis extending from the actuator axis of rotation, the first actuator arm having a region of reduced thickness disposed between the arm longitudinal axis and the disk axis of rotation, an average thickness of the first actuator arm in the region of reduced thickness being less than an average thickness of the first actuator arm at an equal distance from the actuator axis of rotation but on an opposing side of the arm longitudinal axis; and a first suspension assembly having first and second flexible legs, the first suspension assembly coupled to the first actuator arm via the first and second flexible legs, the second flexible leg being disposed closer to the disk in a direction parallel to the disk axis of rotation than the first flexible leg and closer to the disk axis of rotation than the first flexible leg.

2. The disk drive of claim 1 wherein the first actuator arm includes a first recess, the region of reduced thickness being disposed at the first recess.

3. The disk drive of claim 1 wherein the first recess is disposed in the first actuator arm opposite the disk in a direction parallel to the disk axis of rotation.

4. The disk drive of claim 1 wherein the first recess is generally step-shaped.

5. The disk drive of claim 1 wherein the region of reduced thickness is generally elongated extending along the first actuator arm.

6. The disk drive of claim 1 wherein the first actuator arm includes a first rail, a second rail, and an arm opening disposed through the first actuator arm between the first and second rails, the region of reduced thickness being disposed at the first rail.

7. The disk drive of claim 6 wherein the region of reduced thickness extends in a direction orthogonal to the arm longitudinal axis between 50% and 100% across the first rail.

8. The disk drive of claim 1 wherein the region of reduced thickness has a width in a direction orthogonal to the arm longitudinal axis that is between 10% and 25% of an overall width of the first actuator arm at a same distance along the arm longitudinal axis from the actuator axis of rotation.

9. The disk drive of claim 1 wherein the average thickness in the region of reduced thickness is between 5% and 30% of the average thickness of the first actuator arm at an equal distance from the actuator axis of rotation but at an opposing side of the arm longitudinal axis.

10. The disk drive of claim 1 wherein the actuator further includes a second actuator arm, the disk being disposed between the first and second actuator arms with respect to disk axis of rotation, the second arm defining a second arm longitudinal axis extending from the actuator axis of rotation, the second actuator arm having a region of reduced thickness being disposed between the second arm longitudinal axis and the disk axis of rotation, the second actuator arm having a region of reduced thickness disposed between the second arm longitudinal axis and the disk axis of rotation, an average thickness of the second actuator arm in the region of reduced thickness being less than an average thickness of the second actuator arm at an equal distance from the actuator axis of rotation but on an opposing side of the second arm longitudinal axis.

11. The disk drive of claim 10, further comprising a second suspension assembly having first and second flexible legs, the second suspension assembly coupled to the second actuator arm via the first and second flexible legs of the second suspension assembly, the second flexible leg of the second suspension assembly being disposed further from the disk in a direction parallel to the disk axis of rotation than the first flexible leg of the second suspension assembly and closer to the disk axis of rotation than the first flexible leg of the second suspension assembly.

12. The disk drive of claim 1, further comprising electrically conductive traces disposed along the first actuator arm and on an opposite side of the arm longitudinal axis than is the region of reduced thickness.

\* \* \* \* \*